(12) United States Patent
Petite et al.

(10) Patent No.: US 7,019,667 B2
(45) Date of Patent: *Mar. 28, 2006

(54) SYSTEM AND METHOD FOR ACCURATE READING OF ROTATING DISK

(75) Inventors: Thomas D. Petite, Douglasville, GA (US); Richard M. Huff, Convers, GA (US); James Davis, Woodstock, GA (US)

(73) Assignee: StatSignal Systems, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,019

(22) Filed: Aug. 30, 2004

(65) Prior Publication Data

US 2005/0030199 A1  Feb. 10, 2005

Related U.S. Application Data

(63) Continuation of application No. 09/956,377, filed on Sep. 19, 2001, now Pat. No. 6,784,807.

(60) Provisional application No. 60/267,736, filed on Feb. 9, 2001.

(51) Int. Cl.
*G08C 19/38* (2006.01)

(52) U.S. Cl. ............ 340/870.02; 324/142; 250/229; 250/230; 250/231; 250/233

(58) Field of Classification Search ............ 340/870.02; 324/142; 250/229, 230, 231, 233
See application file for complete search history.

(56) References Cited

U.S. PATENT DOCUMENTS

| | | | | |
|---|---|---|---|---|
| 4,034,292 A | * | 7/1977 | McClelland, III | 324/157 |
| 4,641,027 A | * | 2/1987 | Renner et al. | 250/237 G |
| 4,678,907 A | * | 7/1987 | Lipski et al. | 250/208.2 |
| 4,680,704 A | * | 7/1987 | Konicek et al. | 382/100 |
| 4,977,368 A | * | 12/1990 | Munday et al. | 324/142 |
| 5,506,404 A | * | 4/1996 | Milan-Kamski | 250/231.14 |
| 6,232,885 B1 | * | 5/2001 | Ridenour et al. | 340/870.02 |
| 6,784,807 B1 | * | 8/2004 | Petite et al. | 340/870.02 |

* cited by examiner

*Primary Examiner*—Albert K. Wong
(74) *Attorney, Agent, or Firm*—Thomas, Kayden, Horstemeyer & Risley (57) ABSTRACT

A novel system and method for achieving accurate readings of the rotational speed, number of revolutions and direction of rotation of a utility system. More specifically, a system and method for retrofitting existing utility meters with a lightweight tape, having contrasting sections of reflective and non-reflective material applied thereto, which is read by optical sensors as the lightweight tape passes by with the revolutions of the disk of the utility meter. Additionally, the system and method detects unauthorized use of the utility or tampering with the utility meter and its functions.

22 Claims, 6 Drawing Sheets

SYSTEM AND METHOD FOR ACCURATE READING OF ROTATING DISK

CROSS-REFERENCE TO RELATED APPLICATION

This application is a continuation of U.S. Patent Application entitled, "System and Method for Accurate Reading of Rotating Disk," having Ser. No. 09/956,377, filed Sep. 19, 2001, now U.S. Pat. No. 6,784,807 which is entirely incorporated herein by reference. This application also claims benefit of Provisional application Ser. No. 60/267,736 filed on Feb. 9, 2001.

TECHNICAL FIELD

The present invention generally relates to obtaining accurate readings of a moving device, such as a rotating disk. The present invention more particularly relates to obtaining an accurate remote reading of a rotating disk of a utility meter and detecting and preventing tampering and theft of utilities.

BACKGROUND OF THE INVENTION

Electrical metering of residential energy has historically been accomplished using electromechanical meters that sense electromagnetic fields in proximity to voltage coils and current carrying conductors. These electromechanical meters are generally effective in metering electrical energy consumption, but are incapable of providing, in a cost effective manner, numerous additional functions currently being demanded by the utility industry. For example, modern utility companies desire metering devices capable of metering, not only total energy consumption, but also many other electrical parameters (e.g., time-of-use).

The industry has responded to this demand by developing completely electronic metering devices. Electronic meters effectively provide the utility with measurements of a number of electrical parameters, as well as many other advantages. For example, to reduce the costs associated with reading meters, utility companies often use electronic metering devices with built-in communications modules capable of communicating meter reading data back to the utility's master station. Such communications networks obviate the need for human meter readers to go to individual subscriber locations to read meters. While such meters may be highly desirable for new installations, replacing existing meters with new, fully electronic meters is generally deemed cost prohibitive.

Various systems and methodologies have been utilized in the past for performing remote reading functions. There are, however, various problems and shortcomings with the methodologies employed in the past. It is often important to provide a remote meter reading system that is easily retrofitted to existing utility meters. Of course, it is particularly important that such retrofitted reading systems fit within the present or available space confines.

Prior methods for remote meter reading have included several different characteristics. In one method, low power radio frequency (RF) transmitters are configured in the utility meters that are capable of transmitting the utility consumption data to a remote location. For instance, RF transmitters can be applied so that utility personnel can simply drive through a neighborhood and remotely collect the meter consumption data by receiving the RF signal. This permits the utility companies to read the meters without having to physically access each individual meter, leading to faster and more efficient collection of meter readings. In another prior method, cellular transmitters are configured into the utility meters that can then transmit the utility consumption data back to the utility company. Additionally, the utility meter can be directly connected to a phone line and then utility consumption data can then be routinely transmitted over phone lines. After collection of the consumption data, the data is communicated to a central station (i.e. the utility company) through a gateway and a wide area network (WAN), such as the Internet. The data can then be analyzed and monitored using an appropriately configured computer and database. Although each of the aforementioned methods of remotely collecting utility consumption data is convenient and efficient for the utility companies, it does not address the concern of the accuracy of the readings and the detection of tampering with the utility meter.

When reading remotely, the utility company could simply "read" the index by implementing devices that interpret the movement of the dials that comprise the index and convey that data to a remote location. However, utility companies desire readings with greater accuracy and the ability to determine whether someone has tampered with the utility meter. Therefore, the utility companies desire the ability to monitor and count the revolutions of the rotating disk of the utility meter. One method for increasing the accuracy of remote meter reading has involved painting or marking a black stripe on the underside of the disk, and configuring an optical sensor to read and count the number of times the black stripe passes the optical reader, and then transmitting the data to a receiver. This approach, however, suffers several drawbacks.

First, it is often difficult to obtain accurate and reliable readings. Although the disk is silver in color, it does not always provide a good reflectivity. Consequently, the contrast between the black stripe and disk may not be as "electrically readable" as desired. Empirical tests have shown that, on a three volt scale, often only a 0.8 volt difference is measured between readings of the black stripe and the silver disk. These readings are further compromised by the fact that the paint or marker typically fades over time, and that good/definable edges are often not present on the black stripe. Faded color and poorly defined edges lead to misreadings and, therefore, inaccuracy in the remote reading system.

A second shortcoming of this type of system is its failure to determine when the disk is not moving or when the disk is rotating in a reverse direction. Theft of electricity has increased in recent years, and many consumers have discovered ways to bypass electrical meters or otherwise cause the disk to stop rotating for extended periods of time. Still other consumers have discovered ways to actually cause the disk to rotate in a reverse direction. With the marking or painting system it is difficult, if not impossible, to detect and prevent these and other types of electricity theft.

In U.S. Pat. No. 5,086,292 to Johnson et al., a system for detection of tampering with a utility meter is disclosed. In Johnson, a utility meter is outfitted with a plurality of sensors which monitor the tilt, electric field, magnetic field, temperature, sound, reverse rotation and movement of the rotating disk. However, the invention of Johnson is not easily retrofitted to existing utility meters and requires extensive circuitry and software support in order to adequately perform its tamper detection and electricity consumption monitoring functions. Similarly, in U.S. Pat. No. 6,100,816 to Moore, an adapter device is disclosed which remotely monitors consumption and is retrofittable to existing utility meters. However, the Moore adapter module device requires substantial space to mount the device to a utility meter and additionally requires direct linkage to the original meter's dials and a plurality of other moving parts in order to monitor electricity consumption. Furthermore, because the Moore device is retrofitted to the outside of the existing utility meter it is more prone to tampering.

Accordingly, it is desired to provide an improved system that addresses and overcomes the aforementioned deficiencies and inadequacies of the prior art.

SUMMARY OF THE INVENTION

The present invention provides a system and method for obtaining an accurate reading of a utility meter. Additionally, the present invention provides a system and method for determining tampering with utility meters and theft of electricity.

Briefly described, in architecture, the system can be implemented as follows. The present invention utilizes a reflective tape affixed to the rotating disk of a utility meter. This reflective tape is constructed so as to have sections of highly reflective material and non-reflective material, separated by clearly defined edges. Thus, the difference between the reflective areas and the non-reflective areas provides a high degree of contrast and facilitates the "readability" of the tape. As the disk rotates with the use of electricity, the tape is "read" by an optical sensor that is connected to a circuit card. The circuit card is retrofittably mounted in available space within the utility meter so that the optical sensor aligns with the tape as it is carried through its revolutions. By "reading" the passage of the reflective and non-reflective sections of the tape, the consumption of electricity and the rotational direction of the disk can be accurately determined. The consumption data is then communicated to the circuit card and then transmitted to the utility company.

The present invention can also be viewed as providing a method for retrofitting existing utility meters so as to obtain more accurate meter readings and detect unauthorized use or tampering with utility meters. In this regard, the method can be broadly summarized by the following steps: applying a light-weight, highly-reflective tape, such as mylar tape, to the rotating disk of a utility meter and installing an optical sensor and circuit card in such a manner that the optical sensor aligns with and "reads" the tape as it is carried through its revolution on the disk. The reflective tape is marked with sections of non-reflective material and the contrast between these sections is "read" by the optical sensor and the results communicated to the circuit card. The consumption data is then transmitted to the utility company for analysis and monitoring.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The accompanying drawings, incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings like reference numerals designate corresponding parts throughout the several views.

DETAILED DESCRIPTION OF THE PREFERRED EMBODIMENTS

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
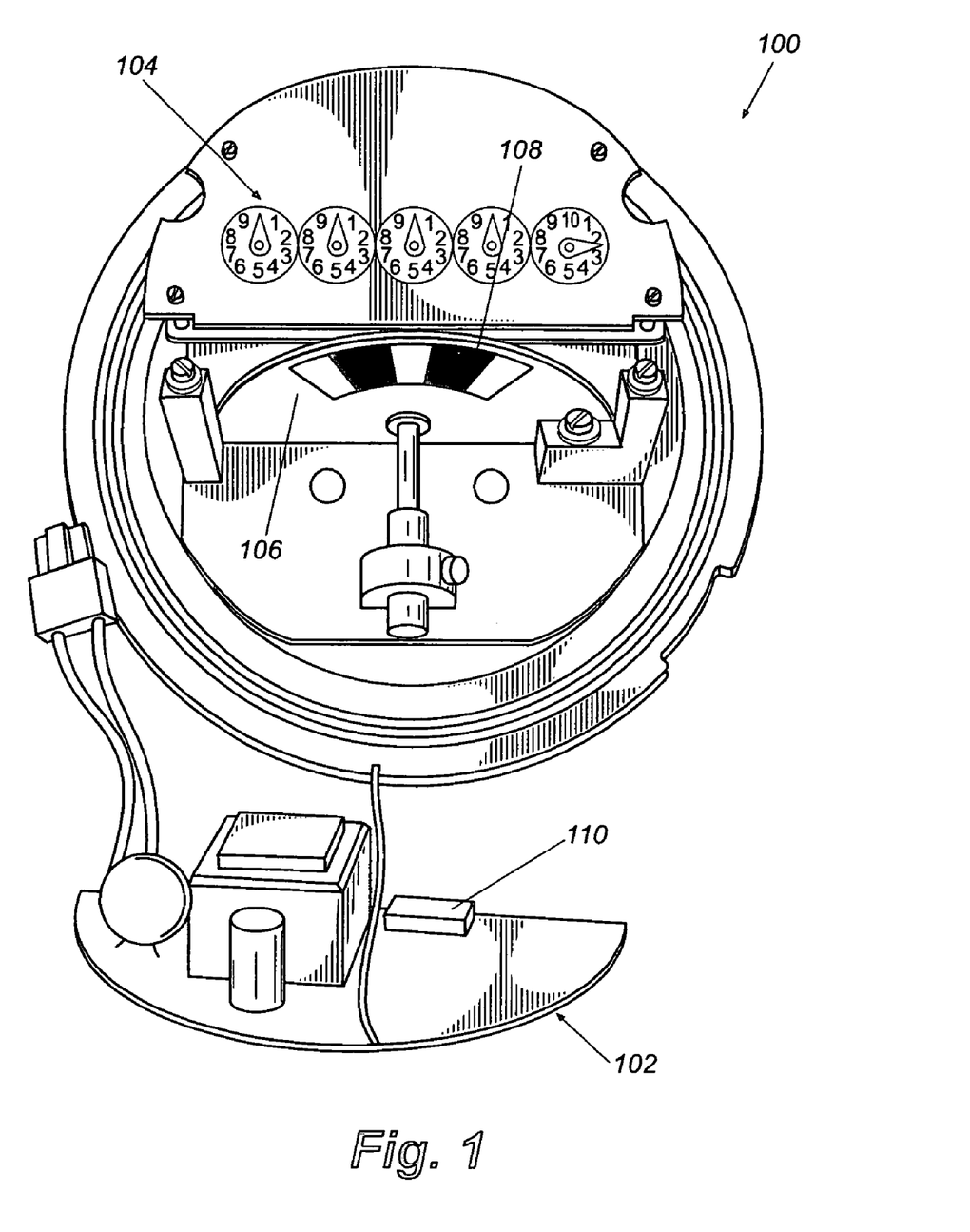
FIG. 1 is a front view showing a utility meter and a circuit card (exploded from the utility meter) of the present invention.
Figure 2:
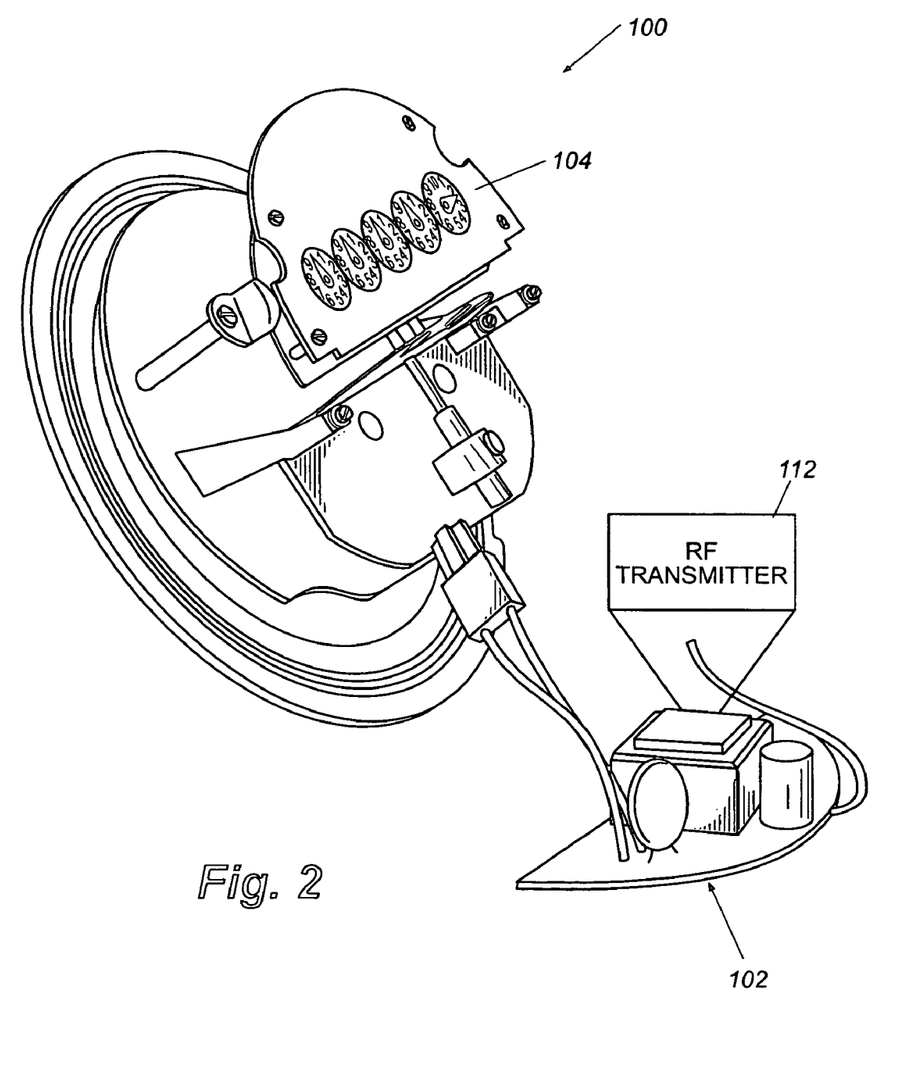
FIG. 2 is a side view showing a utility meter, a circuit card (exploded from the utility meter) and a RF transmitter of the present invention.

Reference is now made to FIGS. 1 and 2, which are a front view and side view, respectively, of a utility meter 100 showing a circuit card 102, constructed in accordance with the invention, exploded therefrom. The meter 100 includes an "index" 104 comprising five dials, which collectively, provide a visual indication of the current reading for the utility meter. In addition to the index 104, the utility meter 100 includes a rotating disk 106 that rotates at a speed that is proportional to the instantaneous electrical consumption of the meter. Each revolution of the disk 106 corresponds to a defined amount of electrical consumption. This amount may vary from meter to meter depending upon the manufacturer of the meter 100; however, amounts on the order of 3.5 watts to 7 watts per revolution of the disk 106 are common. The manner in which the meter 100 monitors and displays electrical consumption is well known, and need not be described herein. Instead, the following description will focus principally upon the inventive features of the illustrative embodiments.

In this regard, the present invention provides a novel system and method for taking an accurate reading of the rotational speed (as well as maintaining a count of the revolutions) of the disk 106. In accordance with the inventive system and method, highly accurate readings are obtained. In addition, the system and method of the present invention detects many types of improper use or unauthorized tampering with the meter 100 not heretofore accomplished by systems of the prior art. Broadly, the present invention utilizes a highly-reflective (preferably mylar) tape 108, which is affixed to the bottom side of the disk 106. The tape 108 is constructed to have extremely high contrasting reflective and non-reflective sections, defined by sharp lines of distinction. The backing of the mylar tape 108 provides an extremely high reflectivity such that the contrasting areas between the non-reflective sections 301, seen as black stripes, and the reflective mylar sections 302 of the tape 108 are easily readable by an optical sensor 110 that is provided on the circuit card 102. The consumption data obtained by the optical sensor 110 is processed by the circuit card 102 and any well-known remote transmission method, such as the RF transmitter 112 shown in FIGS. 2 and 3, can then be used to transmit the consumption data to a remote location.

The circuit card 102 is illustrated in FIGS. 1 and 2 as being exploded from the utility meter 100. In the preferred embodiment, however, the circuit card 102 mounts to the utility meter 100 in the vacant space that is generally available beneath the disk 106. The optical sensor 110 is positioned in a way that aligns with the mylar tape 108 as the mylar tape 108 is carried through revolutions on the disk 106. It will be appreciated that the present invention provides a system and method that is readily retrofittable to existing utility meters. In this regard, all that is required is the adhesion of a small piece of mylar tape 108 to the underside of the disk 106, and the attachment of the circuit card 102 in the available space beneath the rotating disk 106. Processing circuitry and software may be provided within circuit components on the circuit card 102. Although the particular circuitry and software have not been illustrated herein, the discussion provided herein is sufficient for persons skilled in the art to implement the teachings of this invention.

Figure 3:
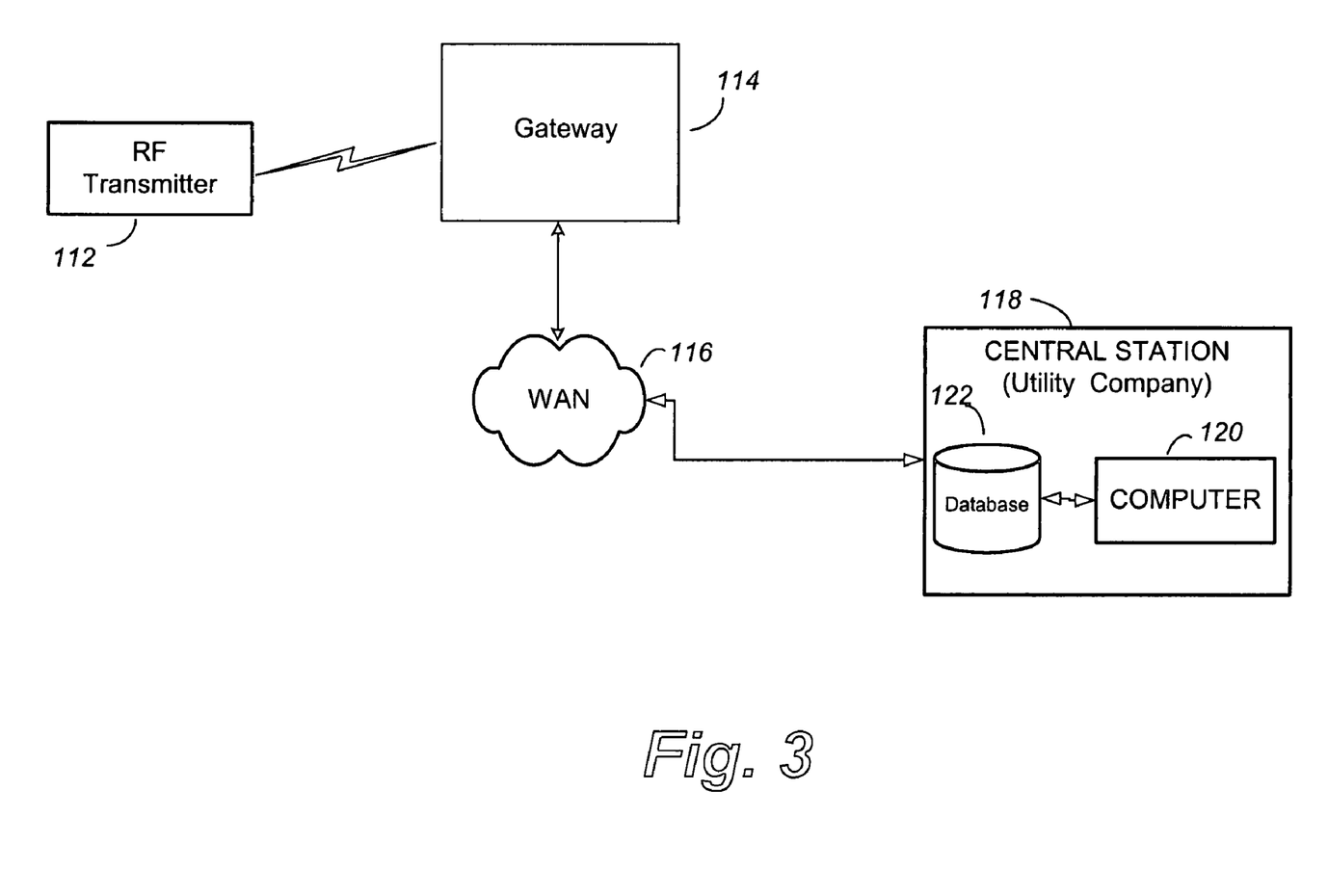
FIG. 3 is a block diagram showing components associated with transmitting utility consumption data from a utility meter to a remote receiving location, including a transmitter, gateway and WAN.

It will be appreciated that the present invention can readily be configured to transmit data to a remote location so as to provide remote meter reading capabilities. As shown in FIGS. 2 and 3, a transmission device 112 can be configured or retrofitted into the utility meter 100 which will support remote reading functions. FIG. 3 discloses that a transmission device 112, such as the RF transmitter, can transmit the consumption data through a gateway 114 and a WAN 116, such as the Internet, to a central station 118, such as the utility company. It is envisioned that the central station may take the form of an appropriately configured computer 120 and database 122 for analysis and monitoring of the consumption data. It is anticipated that persons skilled in the art will envision other transmission devices 112 or methods for transmitting data from the utility meter 100 to a remote location that could be used to accomplish the gathering and transference of the utility consumption data taught herein.

One important aspect with regard to the mylar tape 108 is that the mylar tape 108 is extremely lightweight. Thus, the mylar tape 108 does not upset the balance of the disk 106 or affect its rotation (the disk 106 being magnetically balanced within the meter 100).

Therefore, in accordance with one embodiment of the invention, a system is provided comprising a utility meter 100 having a rotating disk 106, a segment of lightweight and highly reflective tape 108 affixed to the disk 106, an optical sensor 110 with associated circuitry attached to the meter 100 so as to "read" the mylar tape 108 which passes the optical sensor 110 as the disk 106 rotates, and a transmission device 112.

In accordance with another aspect of the invention, a method is provided for retrofitting existing utility meters 100, comprising the steps of applying a lightweight tape 108 to the rotating disk 106, installing an optical sensor 110 positioned to "read" the tape as it passes the optical sensor 110 as the disk 106 rotates, and transmitting the readings of the optical sensor 110 to a remote location.

In accordance with these broad inventive concepts, it will be appreciated that various implementations and embodiments may be utilized. For example, the tape (preferably mylar) 108, which contains a reflective backing, may contain only a single non-reflective (i.e., blackened stripe) section 301. In an alternative embodiment, the tape 108 may contain multiple non-reflective sections 301. Indeed, in a preferred embodiment, multiple non-reflective sections 301, having predefined widths and spacings, are provided so that the optical sensor 110 may readily detect backward rotation of the disk 106. In one embodiment of the invention, only a single optical sensor 110 may be utilized. In the preferred embodiment, however, two optical sensors 202, 204 are used to provide a greater ability to distinguish instantaneous rotational speed, as well as backward rotation of the disk 106.

Figure 4:
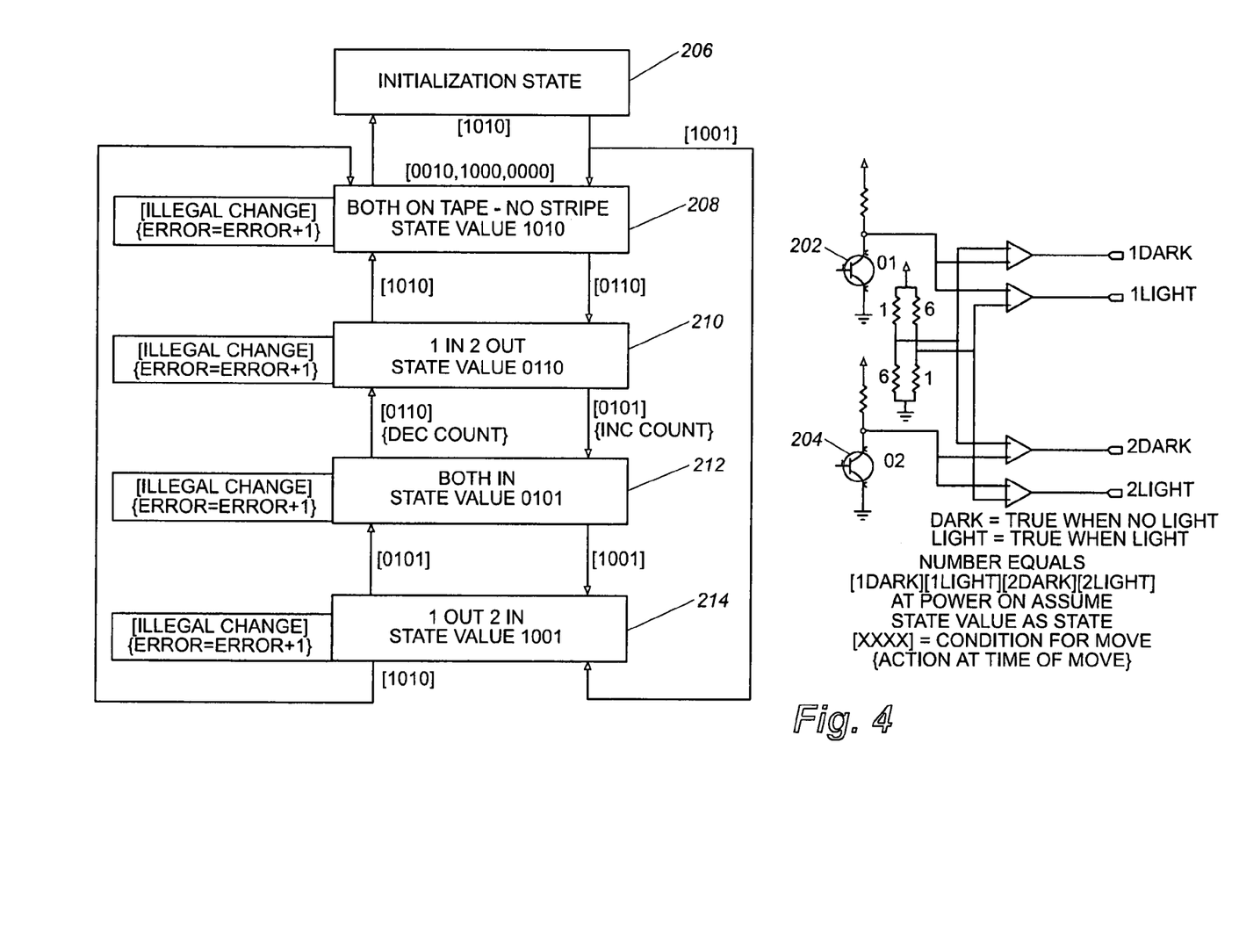
FIG. 4 is a schematic diagram showing circuitry associated with an optical sensor of one embodiment of the invention, and further showing a state diagram of the embodiment.

Having described the top-level concepts of the invention, reference made briefly to FIG. 4, which is a schematic diagram showing two optical sensors 202, 204 and the associated circuitry with those optical sensors 202, 204. Also shown in FIG. 4 is a top-level state diagram illustrating the various "states" of the optical sensors 202, 204. A first state 206 is called the "initialization" state, which occurs when one or both of the optical sensors 202, 204 align with the underside of the disk 106 itself. That is, neither optical sensor 202, 204 is aligned with either a reflective section 302 or a non-reflective section 301 of the tape 108. It will be appreciated that the reflective section 302 of the tape 108 provides a much greater reflectivity than the reflectivity obtained from the disk 106 itself and that the non-reflective sections 301 on the tape 108 provide virtually no reflectivity. Accordingly, the initialization state 206 is the state in which the voltage outputs from the optical sensors 202, 204 (and their surrounding circuitry) fall within a predefined midrange of the voltage scale. Hypothetically, consider a voltage range between zero and three volts. When an optical sensor 202, 204 aligns with the non-reflective section 301, the output voltage will be extremely close to three volts. Conversely, when an optical sensor 202, 204 aligns with the reflective section 302 of the mylar tape 108, the output from the circuitry will be very near zero volts.

Other states in the schematic diagram of FIG. 4 illustrate when both optical sensors 202, 204 are aligned with the mylar tape 108 and neither align with the non-reflective section 301 (state 208), when the first optical sensor 202 aligns with the non-reflective section 301 and the second optical sensor 204 is aligned with the reflective section 302 of the mylar tape 108 (state 210), when both optical sensors 202, 204 align with the non-reflective section 301 (state 212), and when the first sensor 202 aligns with the reflective section 302 and the second sensor 204 aligns with the non-reflective section 301 (state 214). It will be appreciated that various methodologies may be programmed to handle the original power up and/or synchronization of the circuitry. By monitoring only a single revolution or two of the disk 106, the system can be readily configured to dynamically adjust to voltage ranges expected or identifiable with the non-reflective section 301, the reflective section 302, or the medium of the disk 106 itself.

Figure 5:
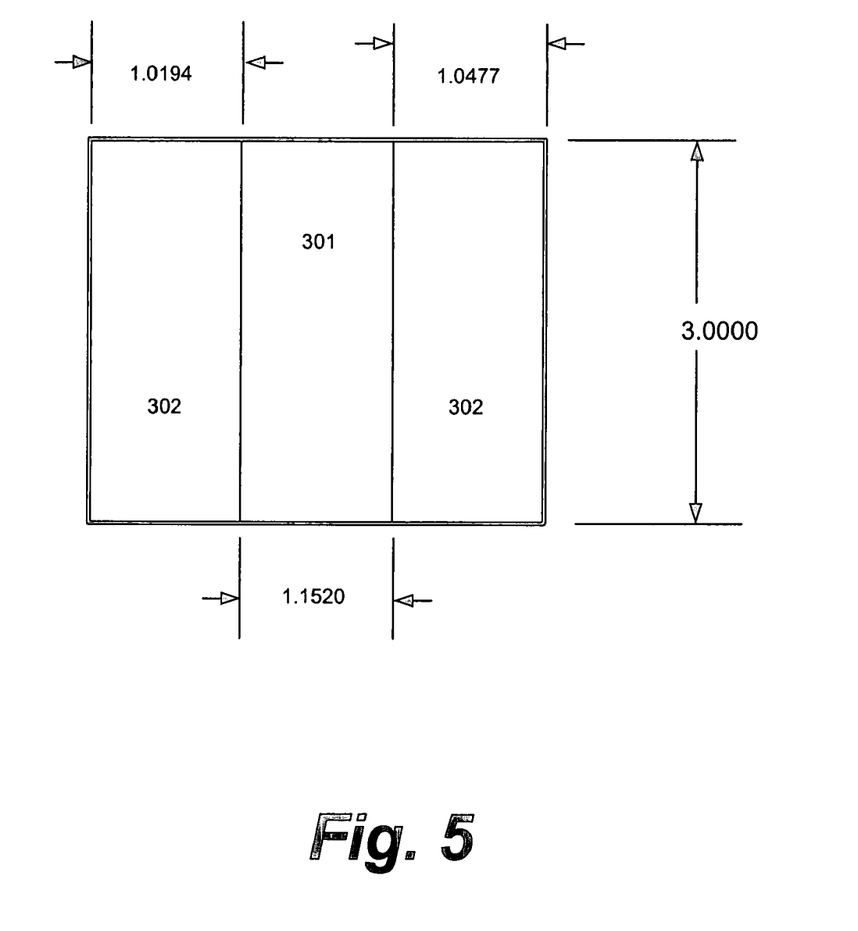
FIG. 5 is a diagram illustrating the reflective and non-reflective sections for a preferred embodiment of the invention.

FIG. 5 illustrates a dimensional segment of mylar tape 108 constructed in accordance with a preferred embodiment of the invention. In this respect, the mylar tape 108 is comprised of three sections. Two of the sections are reflective 302 and one section is non-reflective 301. The non-reflective section 301 is sandwiched between the two reflective sections 302. FIG. 5 further indicates the preferred dimensions for the sections of the mylar tape 108, comprising one of the two reflective sections 302 having a width of approximately 1.0194 cm and the other reflective section 302 having a width of approximately 1.0477 cm, and the non-reflective section 301 having a width of approximately 1.1520 cm. Thus the overall length of the mylar tape 108 is approximately 3.2191 cm while the width of the mylar tape 108 is approximately 3.0 cm.

Figure 6:
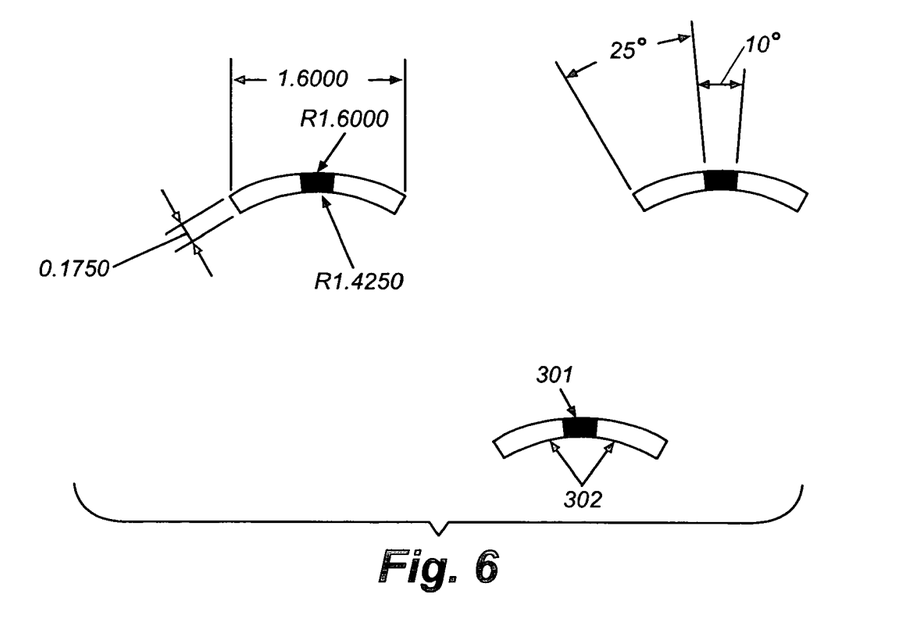
FIG. 6 is a diagram illustrating the reflective and non-reflective sections for another embodiment of the invention.

Reference is made to FIG. 6, which illustrates a short segment of mylar tape 108 constructed in accordance with another embodiment of the invention. As shown in FIG. 6, the tape 108 is preferably accurately shaped to align with the perimeter of the disk 106 (or be paralleled therewith). The mylar tape 108 illustrated in FIG. 6 shows only a single non-reflective section 301, sandwiched between two reflective sections 302 of the tape 108. FIG. 6 further indicates the preferred dimensions for the tape 108, comprising a length of approximately 1.6 cm, a width of approximately 0.175 cm, an inner radius of curvature of 1.425 and an outer radius of curvature of 1.600. Additionally, the angle of the lines of the reflective 302 and non-reflective 301 sections are 25° for the reflective 302 sections and 10° for the non-reflective 301 section.

Figure 7:
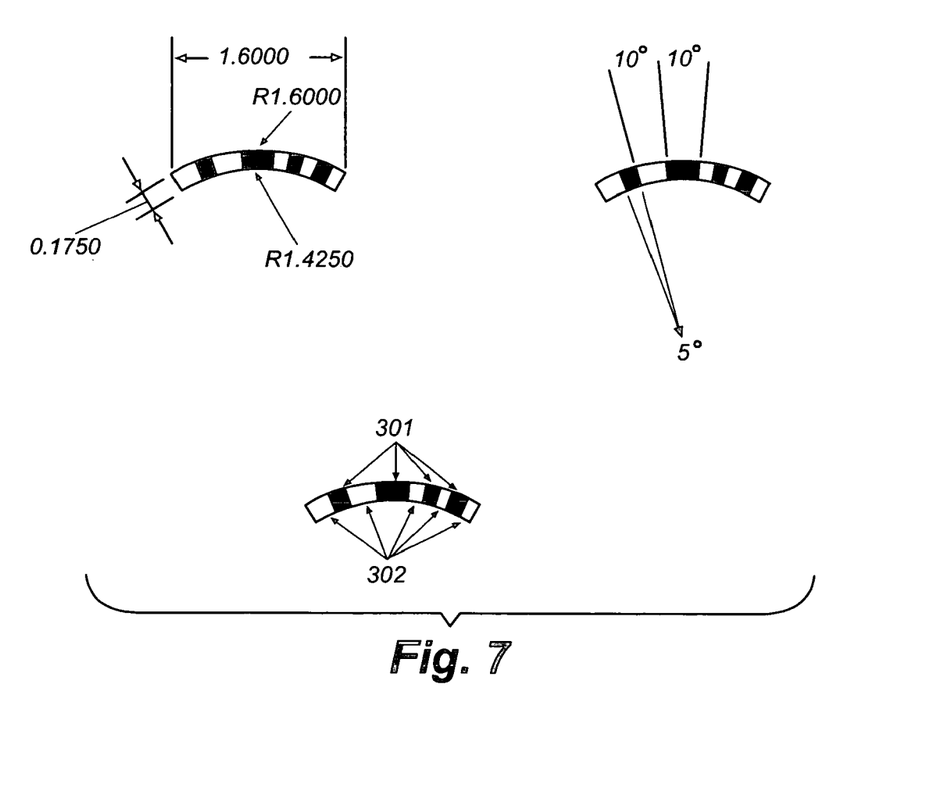
FIG. 7 is a diagram illustrating the reflective and non-reflective sections for a further embodiment of the invention.

Reference is now made to FIG. 7, which shows a segment of mylar tape 108 constructed in accordance with a further embodiment of the invention. This embodiment illustrates four non-reflective sections 301 that are alternately sandwiched between five reflective sections 302 of the mylar tape 108. As illustrated, the non-reflective sections 301 and the reflective sections 302 may be of varying widths. For example, in one embodiment, the resultant angle of the lines for the reflective 302 and non-reflective 301 sections are shown to be 5° and 10° for two of the non-reflective sections 301 and 10° for one of the reflective sections 302. These widths may be used in combination with multiple optical sensors 202, 204 to better detect both speed and direction of the disk rotation. The tape illustrated in FIG. 7 also has the preferred dimensions for the tape of a length of approximately 1.6 cm, a width of approximately 0.175 cm, an inner radius of curvature of 1.425 and an outer radius of curvature of 1.600. However, as with the configuration of reflective 302 and non-reflective 301 sections on the tape 108, the overall dimensions of the tape 108 may be configured to provide improved reading accuracy.

The meter 100 of the preferred embodiment will also preferably include a RF transmitter 112 for transmitting information regarding the current reading as well as the instantaneous usage, rotational speed and rotational direction of the disk 106 to a remote location. Consistent with the invention, a variety of RF transmitters 112 may be implemented. Indeed, various methodologies in systems are presently known for providing remote meter reading capability to utility meters 100. Therefore, this feature and aspect need not be described herein.

It will be appreciated that the use of a highly reflective mylar tape 108 coupled with optical sensors 202, 204 to detect and measure the rotational speed of the disk 106 of a utility meter 100 as described above, is readily extendable to other fields of uses as well. In this regard, and consistent with a broad aspect of the invention, a highly reflective mylar tape 108 coupled with optical sensors 202, 204 may be utilized to detect and measure movement of an object. In the context of a utility meter 100, the object may be a rotational disk 106. However, in other fields of uses the object may be a virtually endless variety of objects for which measurement and detection is desired.

The embodiment or embodiments discussed herein were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Therefore, having thus described the invention, at least the following is claimed:

1. A system for reading and monitoring a rotating disk, comprising:
   an adhesive material applied to a portion of the rotating disk that is less than the circumference of the disk and having at least one highly reflective section and at least one substantially non-reflective section so as to produce contrasting sections of reflective material and non-reflective material on the adhesive material;
   an optical sensor configured to produce a first output corresponding to detections of the highly reflective section of the adhesive material and a second output corresponding to detections of the substantially non-reflective sections of the adhesive material;
   a processor coupled to the optical sensor configured to interpret the outputs produced by the optical sensor; and
   a transceiver coupled to the processor for transmitting data to a remote location.

2. The system of claim 1, wherein rotations of the rotating disk correspond to a speed of another process that is monitored.

3. The system of claim 2, where speed of the rotating disk is constant.

4. The system of claim 2, wherein the speed of the rotating disk is variable.

5. The system of claim 1, wherein the adhesive material is a lightweight tape.

6. The system of claim 1, wherein the lightweight tape is comprised of Mylar®.

7. The system of claim 1, wherein the adhesive material is applied to a surface of the rotating disk and at least one optical sensor is aligned with the adhesive material so as to read the reflective and non-reflective sections of the adhesive material as the disk rotates.

8. The system of claim 1, wherein the adhesive material has more than one reflective section and more than one non-reflective section.

9. The system of claim 8, wherein the reflective sections have a predefined width and spacing and the non-reflective sections have a predefined width and spacing.

10. The system of claim 8, wherein the reflective sections have equivalent widths and spacing and the non-reflective sections have equivalent widths and spacing.

11. The system of claim 8, wherein the widths and spacing of the non-reflective sections are non-equivalent so that the optical sensor may detect the rotational direction of the rotating disk.

12. The system of claim 1, wherein the processor is configured to determine rotational speed and direction of rotation of the rotating disk in correspondence to the output by the first optical sensor as the first optical sensor detects the highly reflective sections of the adhesive material and the substantially non-reflective sections of the adhesive material.

13. The system of claim 1, further comprising:
a second optical sensor wherein a first optical sensor and the second optical sensor are aligned with the adhesive material so as to read the reflective and non-reflective sections, wherein the processor is configured to determine rotational speed and direction of rotation of the rotating disk in correspondence to outputs by the first and second optical sensors.

14. The system of claim 1, further comprising:
a backend computer electrically coupled to the transceiver for receiving data corresponding to the detections of the highly reflective and the substantially non-reflective portions of the adhesive material.

15. A system for reading and monitoring a moving device having a sequence of highly reflective portions and substantially non-reflective portions, comprising:
a moving device that is a belt;
an optical sensor positioned to detect the sequence of highly reflective portions and substantially non-reflective portions of the moving device and configured to produce a signal corresponding to detections of the highly reflective and the substantially non-reflective portions of the moving device, wherein the sequence of highly reflective and non-reflective portions are positioned at a predetermined location on the moving device that is less than entire surface area of the moving device;
a processor coupled to the optical sensor configured to interpret signals produced by the optical sensor; and
a transceiver coupled to the processor for transmitting data to a remote location.

16. The system of claim 15, wherein the sequence of highly reflective portions and substantially non-reflective portions of the moving device are integral to the moving device.

17. The system of claim 15, wherein the sequence of highly reflective portions and substantially non-reflective portions of the moving device are comprised on an adhesive material that is applied to a portion of the moving device that is less than the outer boundary of the moving device.

18. The system of claim 17, wherein the adhesive material is a lightweight polyester film tape with light and dark combinations to measure or identify individual volumes and content based on movement in front of the optical sensor.

19. The system of claim 17, wherein the moving device does not comprise a portion of a utility meter.

20. The system of claim 15, further comprising:
a backend computer electrically coupled to the transceiver for receiving data corresponding to the detections of the highly reflective and the substantially non-reflective portions of the moving device.

21. The system of claim 15, wherein:
the moving device has a rotational motion relative to the optical sensor.

22. The system of claim 15, wherein:
the moving device has a non-rotational motion relative to the optical sensor.

* * * * *